United States Patent [19]

Higashi

[11] Patent Number: 5,386,082
[45] Date of Patent: Jan. 31, 1995

[54] METHOD OF DETECTING LOCALIZATION OF ACOUSTIC IMAGE AND ACOUSTIC IMAGE LOCALIZING SYSTEM

[75] Inventor: Iwao Higashi, Hamamatsu, Japan

[73] Assignee: Yamaha Corporation, Hamamatsu, Japan

[21] Appl. No.: 969,560

[22] Filed: Oct. 30, 1992

Related U.S. Application Data

[63] Continuation of Ser. No. 696,219, May 6, 1991, abandoned.

[30] Foreign Application Priority Data

May 8, 1990 [JP] Japan ................... 2-119343
May 8, 1990 [JP] Japan ................... 2-119344

[51] Int. Cl.$^6$ .................. G10H 7/00; G10H 1/02
[52] U.S. Cl. ...................... 84/630; 84/661; 381/17; 381/1; 381/26; 381/63
[58] Field of Search .................. 381/1, 17, 26, 63; 84/600, 601, 630, 661, DIG. 9, DIG. 26, DIG. 27

[56] References Cited

U.S. PATENT DOCUMENTS

| | | | |
|---|---|---|---|
| 4,188,504 | 2/1980 | Kasuga et al. | |
| 4,219,696 | 8/1980 | Kogure et al. | |
| 4,338,581 | 7/1982 | Morgan | 84/DIG. 26 X |
| 4,410,761 | 10/1983 | Schickedanz | |
| 4,731,848 | 3/1988 | Kendall et al. | 84/DIG. 26 X |
| 4,739,513 | 4/1988 | Kunigi et al. | 381/26 X |
| 4,817,149 | 3/1989 | Myers | 381/1 |
| 5,034,983 | 7/1991 | Cooper et al. | 381/24 X |
| 5,046,097 | 9/1991 | Lowe et al. | 381/17 |
| 5,065,433 | 11/1991 | Ida et al. | 381/63 |
| 5,073,942 | 12/1991 | Yoshida et al. | 381/63 X |
| 5,105,462 | 4/1992 | Lowe et al. | 381/17 |
| 5,142,586 | 8/1992 | Berkhout | 381/63 |
| 5,164,840 | 11/1992 | Kawamura et al. | 381/1 X |
| 5,208,860 | 5/1993 | Lowe et al. | 381/17 |

OTHER PUBLICATIONS

Jens Blauert, translated by John S. Allen, "Spatial Hearing: The Psychophysics of Human Sound Localization" The MIT Press, New material and English translation 1983, pp. 85-93.

Sakamoto, Gotoh, Kogure, and Shimbo, "Controlling Sound Image Localization in Stereo Reproduction," *J. Audio Eng. So.*, vol. 29, Nov. 1981 at 794.

Sakamoto, Gotoh, Kogure, and Shimbo, "Controlling Sound Image Localization in Stereo Reproduction: Part II," *J. Audio Eng. So.*, vol. 30, Oct. 1982 at 719.

*Primary Examiner*—William M. Shoop, Jr.
*Assistant Examiner*—Jeffrey W. Donels
*Attorney, Agent, or Firm*—Spensley Horn Jubas & Lubitz

[57] ABSTRACT

A method of detecting localization of an acoustic image, in which an acoustic impulse is emitted from a sound source to a dummy of a human head, an acoustic sensor is provided to a portion of the dummy's ears, and the response waveform is received by the acoustic sensor. This enables the detection of what effects are derived from interruption, reflection, and the like of a tone due to the human head. The received response waveform is analyzed and parameters for an acoustic image localization system are obtained. The acoustic image localization system comprising a delay circuit, a filter and an amplification controller sets the parameters into the delay circuit, the filter and the amplification controller, so that the detected localization of an acoustic image is reproduced.

22 Claims, 6 Drawing Sheets

METHOD OF DETECTING LOCALIZATION OF ACOUSTIC IMAGE AND ACOUSTIC IMAGE LOCALIZING SYSTEM

This is a file wrapper continuation of Ser. No. 07/696,219 filed on May 6, 1991, now abandoned.

BACKGROUND OF THE INVENTION

1. Field of the Invention

The present invention relates to a method of detecting localization of an acoustic image through which it is detected how a tone is heard by a listener when a sound is emitted in a specific direction at a specific distance, and an acoustic image localizing system utilizing detection results thereof, and more particularly, relates to such an acoustic image localizing system capable of localizing an acoustic image to various places with stereo loudspeakers provided at fixed positions.

2. Description of the Prior Art

At the present time, stereo reproduction systems are designed so as to produce tones of different output levels at a plurality of (right and left) channels, thereby giving the localization of the tone (acoustic image). Two channels, if provided therein, allows a tone to be localized in a two-dimensional manner between two output devices (loudspeakers), and four channels allows an acoustic image to be localized more clearly.

However, there cannot be provided sufficient localization sensation of an acoustic image by such a method in which the localization is represented only by output levels (or ratio) of right and left channels, i.e. differences in sound volume heard by right and left ears. In actual cases, when a sound source (e.g. musical instrument) is placed in a specific direction at a specific distance, not only volume differs between tones heard by right and left ears, but also some differences in the way a tone sounds and moreover those due to subtle time lags are involved as well. Conventional stereo reproduction systems and the like have been incapable of representing such differences, and therefore incapable of obtaining localization as clear as that obtained when musical instruments are actually laid out.

SUMMARY OF THE INVENTION

Accordingly, it is the primary object of the present invention to provide a method of detecting localization of an acoustic image in which any differences in the way a tone sounds depending on a direction in which a tone is heard are measured based on impulse response, and further provide an acoustic image localizing system that can realize clear acoustic image localization by simulating differences in the way a tone is heard (delay time, attenuation factor) depending on a direction of a sound source relative to a listener with the application of measuring results of the above-mentioned method.

The present invention is adapted to give an acoustic impulse to an object of a skull-like shape in a specific direction at a specific distance, and read out the response waveform of the acoustic impulse with an acoustic sensor provided to the object, thereby allowing the localization of an acoustic image in the specific direction at the specific distance to be detected.

Through this, the response waveform of the acoustic impulse is read by the acoustic sensor provided to a side of the skull-shaped object after the acoustic impulse is given thereto in a specific direction at a specific distance. This response waveform is equivalent to how a tone emitted in the above direction and at the above distance actually sounds to human ears (i.e. transmission). The elements accounting for any delay and reverberation include echo, refraction, and others of the skull or the like.

The present invention comprises: memory means for storing therein the response waveform of an acoustic impulse in a plurality of directions at a plurality of distances detected by the foregoing method of detecting localization of an acoustic image of the invention; localization specifying means for specifying a direction and distance of an acoustic image; readout means for reading out the response waveform of an acoustic impulse corresponding to the direction and distance specified by the localization specifying means; and an impulse response filter for receiving a tone signal and controlling the characteristics of the input tone signal, in which filter characteristics are set depending on the response waveform of the acoustic impulse read by the readout means.

The present invention comprises: a processing circuit having a delay circuit, a filter, and an amplifier for processing an input tone signal; a table for storing transmission data including delay timer filtration characteristics, an amplification factor to simulate the transmission of an emitted tone to a listener's ears for each direction relative to the listener; localization direction specifying means for specifying a direction of accoustic image localization of a tone; and readout means for reading out transmission data corresponding to the direction specified by the localization direction specifying means from the table and then feeding the readout to the processing circuit to control delay time of the delay circuit, filtration characteristics of the filter, and an amplification factor of the amplifier.

BRIEF DESCRIPTION OF THE DRAWINGS

These and other objects and features for the present invention will become apparent from the following description taken in conjunction with the preferred embodiments thereof with reference to the accompanying drawings, in which.

DESCRIPTION OF THE PREFERRED EMBODIMENT

Figure 1:
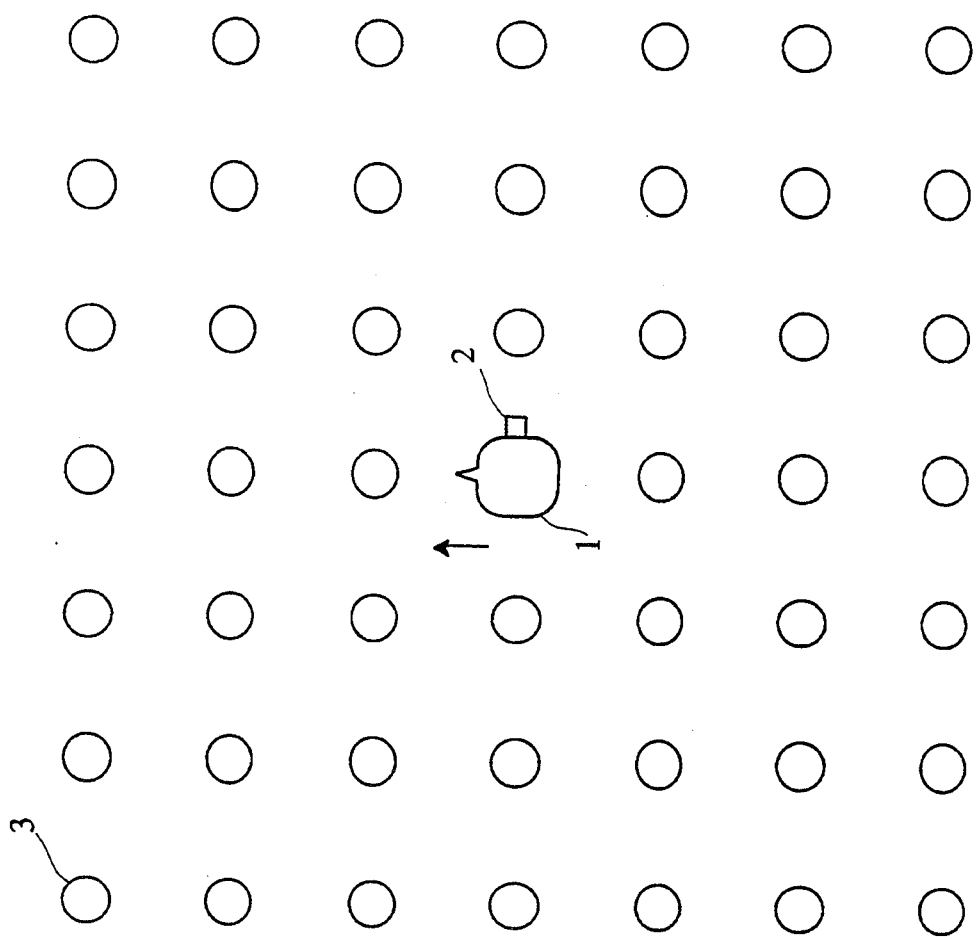
FIG. 1 is a view showing a detection system of a method of detecting localization of an acoustic image which embodies the present invention.

Before the description of the present invention proceeds, it is to be noted that like parts are designated by like reference numerals throughout the accompanying drawings.

FIG. 1 is a view showing measuring equipment used for a method of detecting localization of an acoustic image which embodies the present invention. In this measuring equipment, an acoustic impulse is given to an object (dummy) 1 of a human skull-like shape in various directions, and it is measured how the impulse is transmitted to an acoustic sensor 2 located at an ear of the object 1. At the center of the measuring equipment there is provided the skull-shaped object 1. The object 1 has a shape similar to the human skull, and is so constructed as to be similar to human beings also in the reflection factor and the like. In the Figure, it is positioned to be directed as shown by arrow. At the position of the right ear of the object 1 on its right side, there is provided the acoustic sensor 2, accommodated in a housing similar in shape to its counterpart of human ears. A microphone can be used for the acoustic sensor. Since human ears are symmetrical between right and left, data for the right ear can be inverted to be used as data for the left ear.

Figure 2:
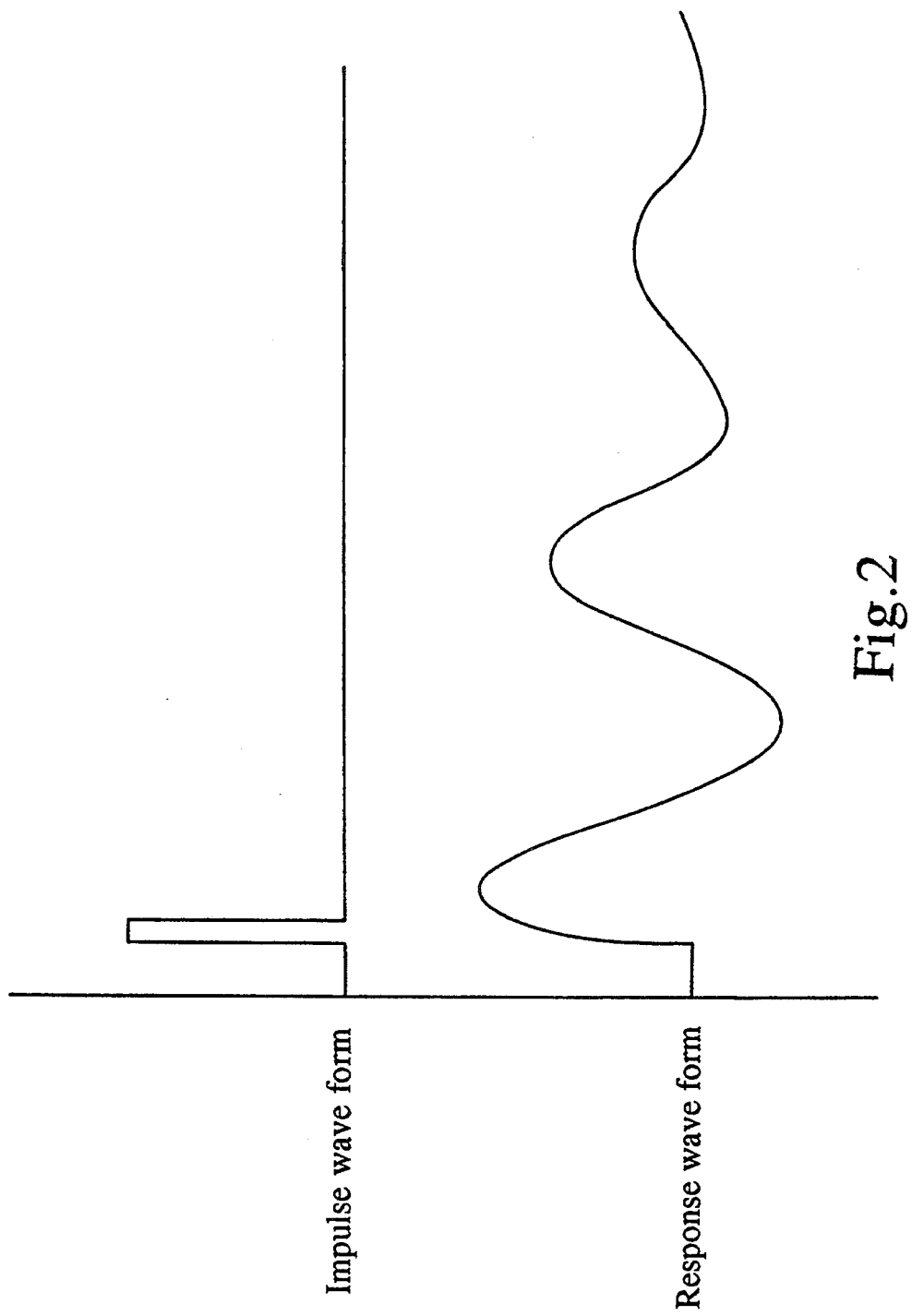
FIG. 2 is a chart showing a response waveform detected by the same method of detecting localization of an acoustic image.

On the periphery of the object 1 there are provided a plurality of sound sources 3, each of which is positioned at a specific angle and distance relative to the object 1. The sound sources 3, as shown in the upper half of FIG. 2, produce an acoustic impulse in the direction toward the object 1 or in a nondirectional manner. The acoustic sensor 2 detects, and a recording device connected thereto records the response waveform of the acoustic impulse. The resulting response waveform is, for example, as shown in the lower half of FIG. 2. It can be seen that the response waveform includes not only a direct wave but also various reflected waves and by-passed waves.

If the measuring equipment is an infinitely extended place such as an anechoic chamber, interruption, reflection, and the like due to the human skull-shaped object 1 (human head) can be measured from the response waveform.

As shown above, since the method of detecting localization of an acoustic image according to the present invention is adapted to read impulse response with an acoustic sensor provided to a skull-shaped object, it can be measured how a tone from a sound source located in a specific direction at a specific distance is heard by human ears, thus giving data that clarifies the localization of an acoustic image in electronic musical instruments or the like.

Figure 3:
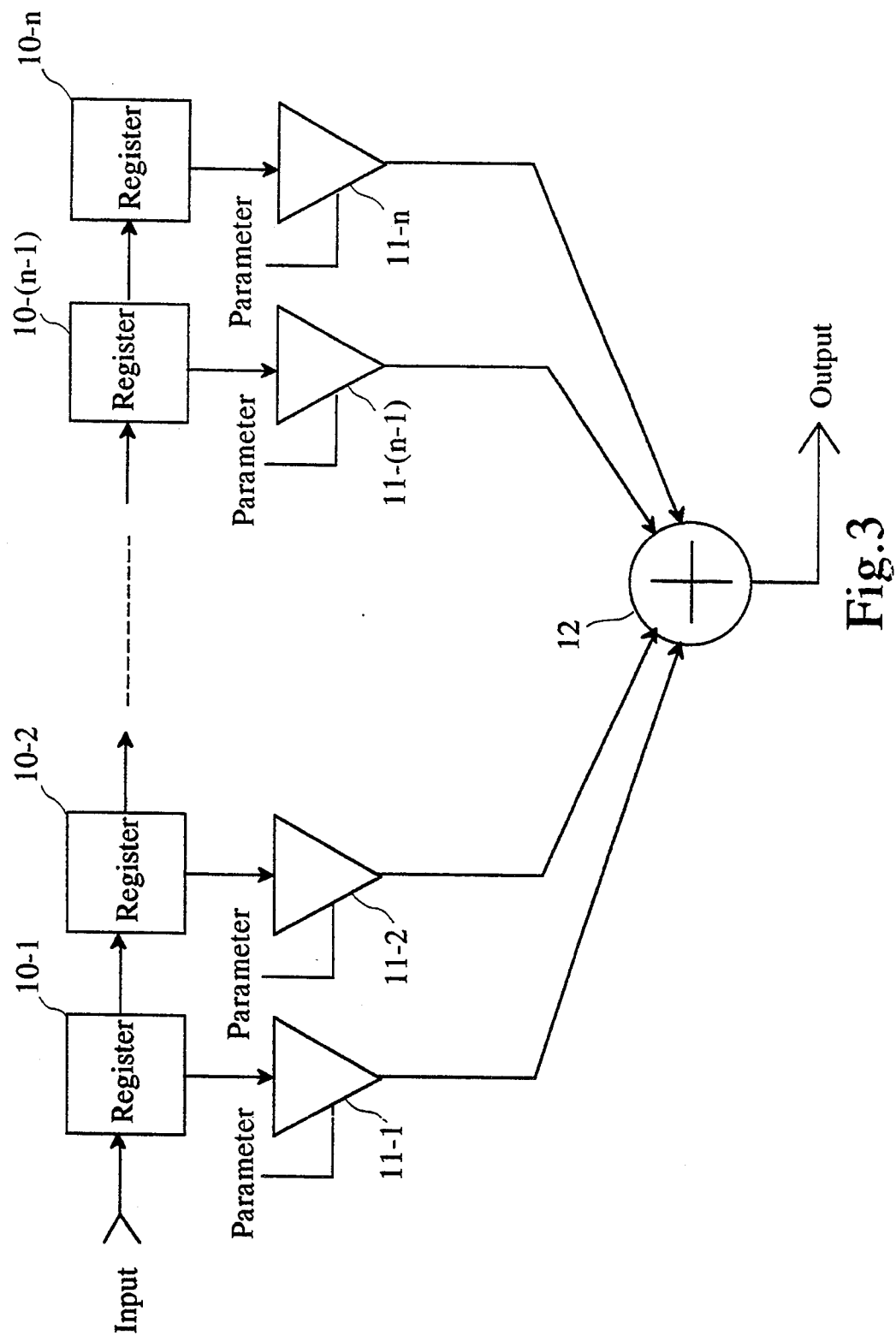
FIG. 3 is a diagram showing a construction of an FIR filter that simulates impulse response.

FIG. 3 shows a construction of an FIR (Finite Impulse Response) filter that simulates impulse response detected by the foregoing method of detecting localization of an acoustic image. This FIR filter is a filter for simulating a spatial transmission system with electric circuits. The filter comprises a shift register train 10 composed of n-in-number registers 10-1 through 10-n, variable gain amplifiers 11 (11-1 through 11-n) for amplifying output of each register, and an adder 12 for summing up outputs of all the variable gain amplifiers 11. The register 10-1 forming one end of the shift register train 10 receives quantized tone signals sequentially according to sampling clocks, which signals are shifted sequentially toward the register 10-n according to the sampling clocks. Each of the variable gain amplifiers 11-1 through 11-n receives parameters for deciding the gain for each variable gain amplifier, each independently. By making the gain for each variable gain amplifier correspondent to such a response waveform as shown in the lower half of FIG. 2, its transmission characteristics can be simulated. That is, by plotting the response waveform in the lower half of FIG. 2 for each timing of shift clocks and further assigning levels at each timing to the gain for each corresponding variable gain amplifier, the adder 12 can obtain such output values as shown in the lower half of FIG. 2 as if a tone is derived from transmission through an actual transmission system.

Figure 4:
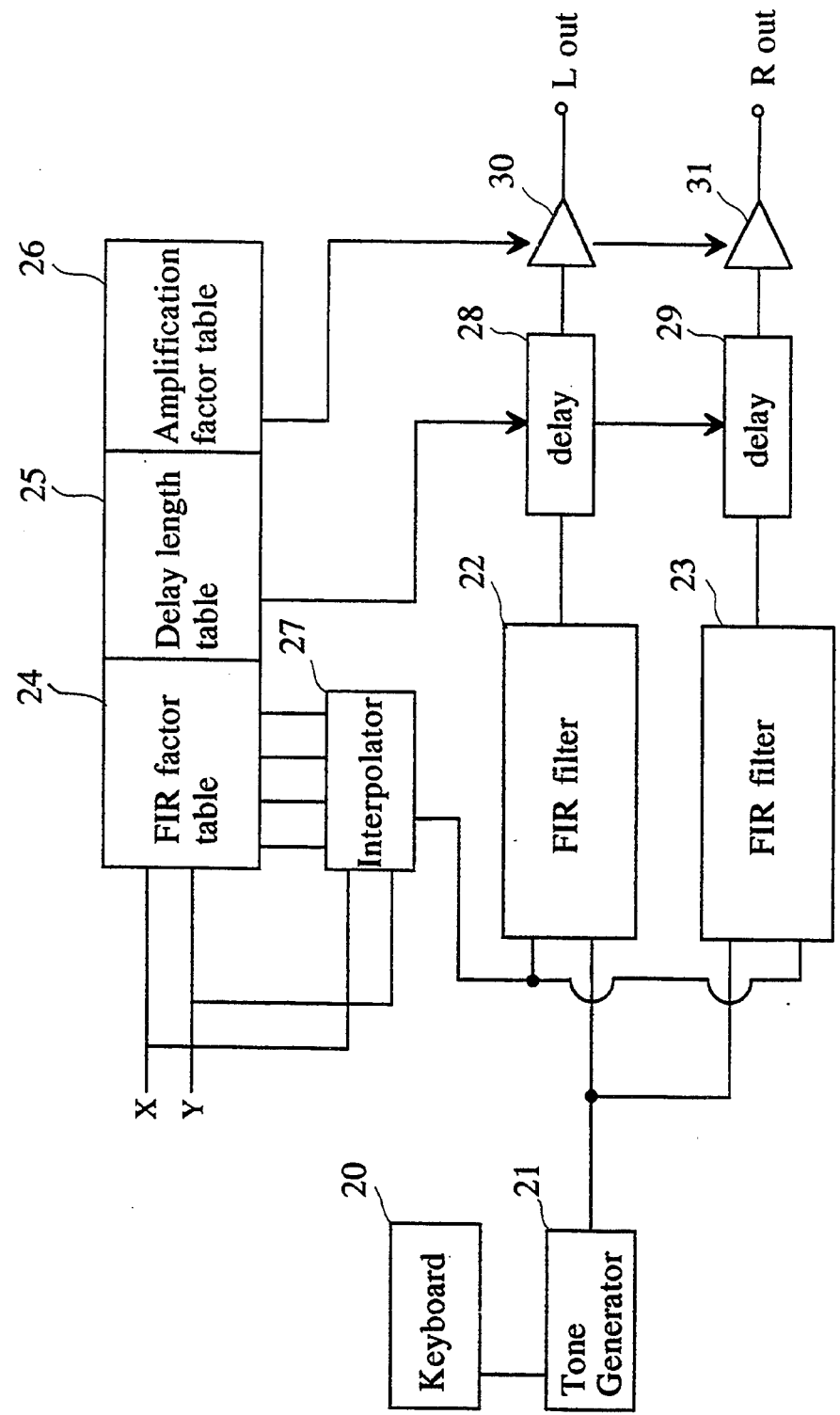
FIG. 4 is a schematic block diagram of an acoustic image localizing system of an embodiment of the present invention.

FIG. 4 is a block diagram schematically showing an acoustic image localizing system which embodies the present invention. To the acoustic image localizing system there are provided a keyboard 20 and a tone generator 21 as a sound source. The keyboard 20 instructs the tone generator 21 on pitch, volume, and tone color of a tone to be generated, while the tone generator 21 forms a tone signal according to the instruction. The formed tone signal is put out to FIR filters 22, 23 as it remains a digital signal (quantized signal).

The FIR filter 22 simulates the transmission to the left ear of a listener, and the FIR filter 23 to the right ear. These FIR filters (each variable gain amplifier) receive parameters from an FIR factor table 24 via an interpolator 27. The FIR factor table 24 has stored therein response parameters each related to each acoustic impulse issued from a plurality of sound sources 3 shown in FIG. 1, and reads out response parameters corresponding to input localization coordinates (X, Y). Localization coordinates are input by a player's operation, or generated by the tone generator 21. When coordinates other than the places of sound sources in FIG. 1 are specified, the interpolator 27 calculates a pertinent parameter using the parameters of sound sources adjacent to the specified localization coordinates. The calculation formula used is of known proportional calculation.

Moreover, to the FIR filters 22, 23 are connected delay circuits 28, 29 and amplifiers 30, 31. The delay circuits 28, 29 receive parameters from a delay length table 25, while the amplifiers 30, 31 receive gain parameters from an amplification factor table 26. Each parameter is put out according to localization coordinates (X, Y).

In this arrangement, locating loudspeakers just at a listener's right and left sides to output tone signals therefrom allows clear acoustic image localization to be given. In addition, the output system may also incorporate headphones in place of loudspeakers. Further, although the output in this embodiment is of two channels, four channels or more also can be used to realize this system.

Incidentally, a response waveform can be measured in a wide variation without being limited to that in which it is measured at regular intervals; for example, it may also be measured at the narrower intervals for the nearer positions and at the more extended intervals for the farther positions. Although FIR filters are provided to each channel in this embodiment, it is also allowable to provide one FIR filter for only one line and use it by time division.

What is more, although the acoustic image localizing system in FIG. 4 is made up of hardware, it may also be of software using a CPU.

As shown above, the acoustic image localizing system of the embodiment uses FIR filters to simulate tone transmission in directions in which a tone is heard, thus enabling clear acoustic image localization to be realized.

Figure 5:
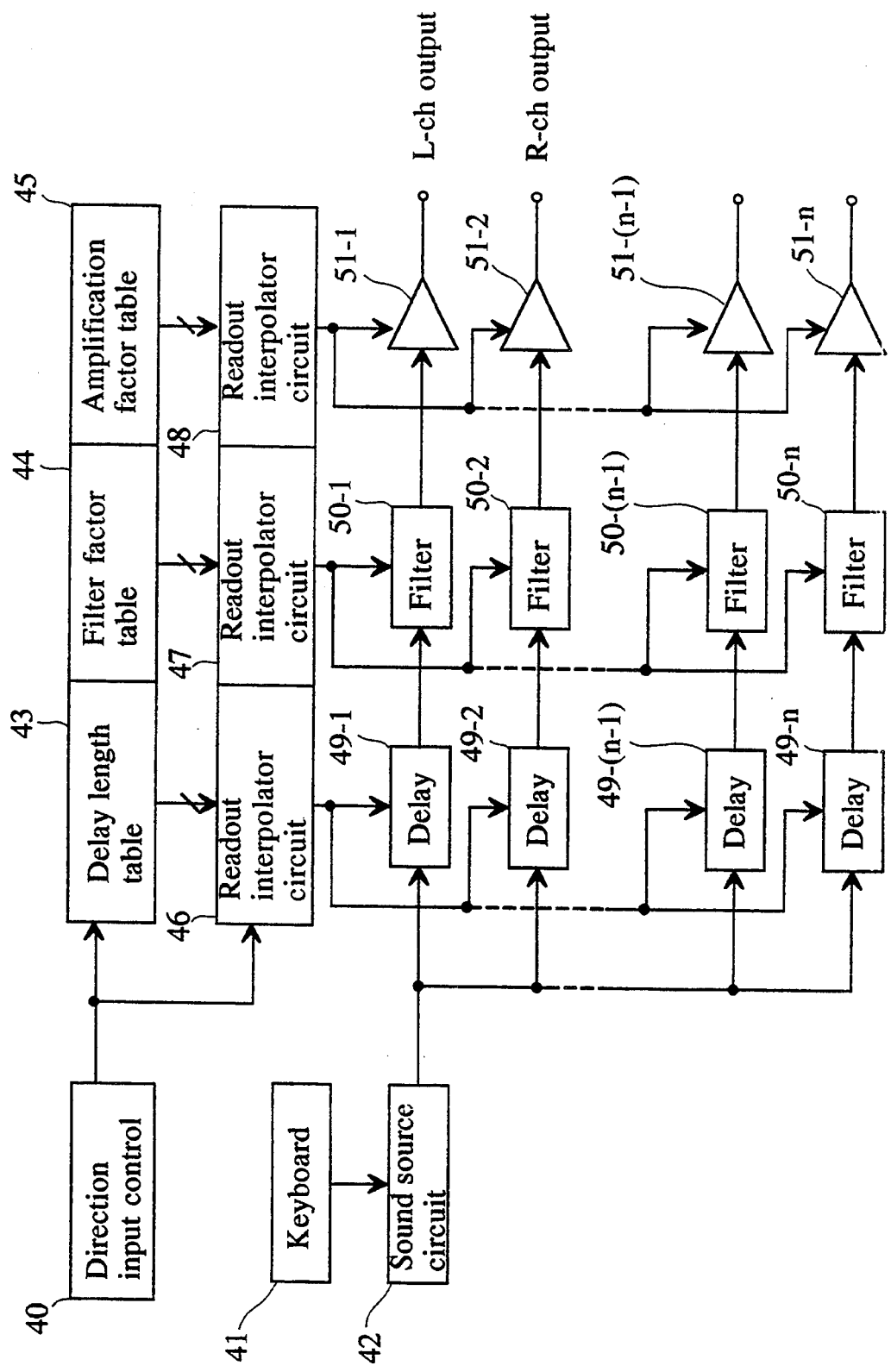
FIG. 5 is a schematic block diagram of an acoustic image localizing system of another embodiment of the present invention.

FIG. 5 is a block diagram schematically showing a construction of an acoustic image localizing system which is another embodiment of the present invention. A difference between this acoustic image localizing system and its counterpart shown in FIG. 4 exists in that there are provided interpolator circuits (readout interpolators) not only to the filter factor table but also to the delay length table and amplification factor table, and that the number of channels is n.

To this acoustic image localizing system, a keyboard 41 and a sound source circuit 42 are connected as a sound source section for which an acoustic image is to be localized. The keyboard 41 instructs the sound source circuit 42 on pitch, volume, and tone color of a tone to be generated, while the sound source circuit 42 forms a tone signal according to the instruction. The formed tone signal is fed to output processing lines of a plurality of channels as it remains a digital signal (quantized signal). The acoustic image localizing system of this embodiment is provided with output processing lines of a plurality of channels (n channels), each of which lines includes a delay circuit 49, a filter 50, and an amplifier 51. The delay circuit 49, filter 50, and amplifier 51 can be set from external for delay time, filtration characteristics, and gain, respectively.

The number of channels, n is in general two or four. The use of two channels allows two-dimensional localization between right and left (R/L) channels, while that of four channels allows clearer localization among right-front (RF), left-front (LF), right-rear (RR), and left-rear (LR) channels. The delay circuit 49, filter 50, and amplifier 51 receive parameters (factors) from a delay length table 43, a filter factor table 44, and an amplification factor table 45 via readout interpolator circuits 46, 47, and 48, respectively.

Figure 6:
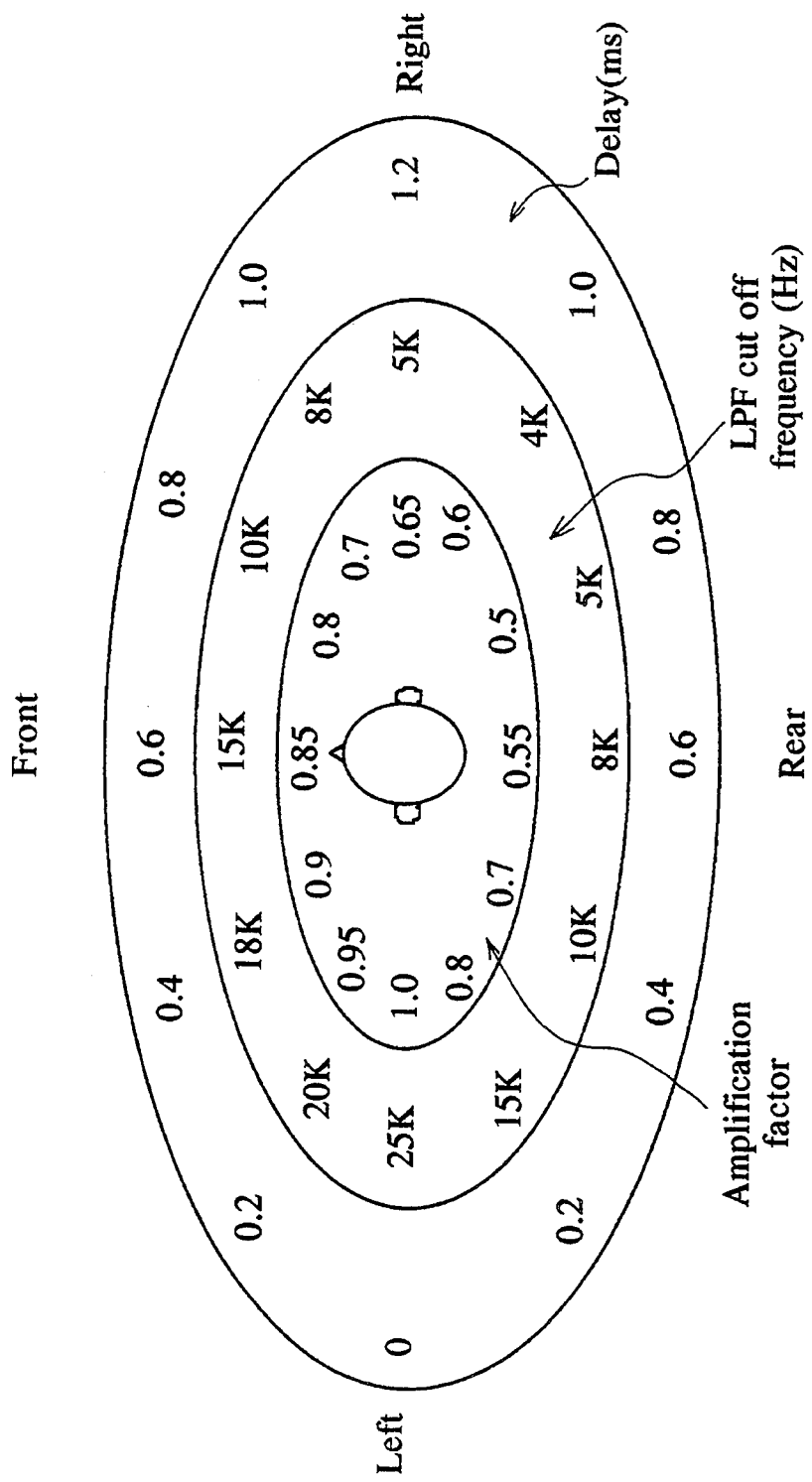
FIG. 6 is a view showing storage contents of a table used in the same acoustic image localizing system.

Each of the tables 43, 44, and 45, as shown in FIG. 6, has stored therein delay time, LPF (low-pass filter) cutoff frequencies, and amplification factors to simulate directions of a sound source relative to a person.

To these tables 43, 44, and 45 and the readout interpolator circuits 46, 47, and 48 is connected a direction input control 40. The readout interpolator circuits 46, 47, and 48 read data corresponding to a direction specified by the operation of the direction input control 40 from the tables 43, 44, and 45. The tables 43, 44, and 45 has stored therein transmission data from 0 degrees (front face) forth in steps of 30 degrees; when a localization direction of any angle other than mentioned above is specified, the readout interpolator circuits 46, 47, and 48 calculate parameters of the specified direction using parameters of measured angles adjacent to the specified direction. The calculation formula used is of known proportional calculation.

In the arrangement as described above, with two channels, if tone signals output from the amplifiers 51-1, 51-2 are put out from loudspeakers located just at a listener's right and left sides, clear acoustic image localization can be given. In addition, the output system may also incorporate headphones in place of loudspeakers. Further, in the case of four channels, loudspeakers are preferably located at four corners, while eight channels, if used, are preferably located at upper and lower portions of four corners, without being limited thereto. Referring to the direction input control 40, any type of one may be used; for example, a mouse or a joy stick supplied to the keyboard may be used and it may also be arranged that a function is previously given so that a functional value put out using time as a variable forms the base of control. The joy stick, if used, allows the direction to be varied in the course of playing, giving a variety of playing performance.

Although the present embodiment adopts monaural sound sources, it can also apply to more- than- one channel sound sources such as stereophonic sound sources.

Further, although the present embodiment is made up of hardware, it may also be of software using a CPU.

As described heretofore, since the acoustic image localizing system of this embodiment is so arranged that delay time, filtration characteristics, and gain of its delay circuit, filter, amplifier, respectively, are switched depending on the direction in which a sound source is localized, the transmission of a tone in the direction in which the tone is heard can be realistically simulated, thus allowing clear localization sensation of an acoustic image to be realized.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An acoustic image localizing system comprising:
memory means for storing response waveform information of acoustic impulses, each provided to a skull-shaped object from a plurality of locations;
localization specifying means for specifying a location of a tone;
readout means for reading out the impulse response waveform information, from the memory means, corresponding to an acoustic impulse provided to the skull-shaped object from a location specified by the localization specifying means;
a finite impulse response filter responsive to a digital tone signal for controlling characteristics of the digital tone signal, wherein filter characteristics are established depending on impulse response waveform information read out by the readout means; and
means for performing interpolation, when any location other than locations stored in the memory means is specified by reading out the impulse response waveform information based on locations adjacent to the specified location.

2. An acoustic signal processing unit comprising:
an acoustic signal processing circuit for processing a digital tone signal input thereto and having a plurality of channels, each of which includes a delay circuit, a filter, and an amplifier; and control means for controlling delay time of the delay circuit, filtration characteristics of the filter, and gain of the amplifier, for each channel, in accordance with stored digital transmission data,
wherein said control means includes direction specifying means for specifying direction of acoustic image localization, and the acoustic signal processing circuit includes readout means for reading out stored digital transmission data corresponding to the direction specified by the direction specifying means, and delay time of said delay circuit, filtration characteristics of said filter, and gain of the amplifier are controlled according to the direction specified by the direction specifying means, and
wherein the acoustic signal processing unit is connected to an electronic musical instrument, so that a digital musical tone signal formed by the electronic musical instrument is input to the acoustic signal processing circuit, and the direction of acoustic image localization of the musical tone signal is controlled by the control means.

3. An acoustic signal processing unit as claimed in claim 2, wherein said direction specifying means is built in said electronic musical instrument from which a digital tone signal is input to said acoustic signal processing circuit.

4. An acoustic image localizing system as claimed in claim 3, wherein said direction specifying means comprises a joy stick type operator.

5. An acoustic image localizing system as claimed in claim 3, wherein said direction specifying means comprises a mouse type operator.

6. An acoustic signal processing unit comprising:
an acoustic signal processing circuit for processing a digital tone signal input thereto and having a plurality of channels, each of which includes a delay circuit, a filter, and an amplifier; and control means for controlling delay time of the delay circuit, filtration characteristics of the filter, and gain of the amplifier, for each channel, in accordance with stored digital transmission data;
a table for storing therein transmission data including delay time, filtration characteristics, and amplification factors to simulate transmission of an emitted tone to the ears of a listener for each of plural directions to the listener;
localizing direction specifying means for specifying a direction of acoustic image localization of a tone;
readout means for reading out transmission data corresponding to the direction specified by the localizing direction specifying means from the table and feeding the transmission data to the processing circuit to control delay time of the delay circuit, filtration characteristics of the filter, and amplification factors of the amplifier; and
means for performing interpolation, when any direction other than the plural directions stored in said table is specified, by reading out data of directions adjacent to the specified direction.

7. An acoustic signal processing unit comprising:
an acoustic signal processing circuit for processing a digital tone signal input thereto and having a plurality of channels, each of which includes a delay circuit, a filter, and an amplifier; and control means for controlling delay time of the delay circuit, filtration characteristics of the filter, and gain of the amplifier, for each channel, in accordance with stored digital transmission data;
a finite impulse response factor table for storing filtration characteristics for a plurality of different locations;
a delay length table for storing delay times for the plurality of different locations;
an amplification factor table for storing amplification factors for the plurality of different locations;
left and right finite impulse response filters coupled to the finite impulse response factor table;
a tone generator for providing a quantized tone signal to the left and right finite impulse response filters and a corresponding location indication to the finite impulse response factor table;
left and right amplifiers coupled to the amplification factor table; and
left and right delay circuits coupled to the delay length table, the left delay circuit being coupled between the left finite impulse response filter and the left amplifier, and the right delay circuit being coupled between the right finite impulse response filter and the right amplifier.

8. An acoustic image localizing system as claimed in claim 7, further comprising a keyboard coupled to provide pitch, volume and tone color signals to the tone generator, and an interpolator coupled between the finite impulse response factor table and the left and right finite impulse response filters and responsive to the corresponding location indication from the tone generator.

9. An acoustic image localizing system comprising:
a delay length table for storing delay times for a plurality of different directions;
a filter factor table for storing filter factors for the plurality of different directions;
an amplification factor table for storing amplification factors for the plurality of different directions;
interpolation calculation means coupled to the delay length table, the filter factor table and the amplification factor table;
a tone image localization position circuit coupled to the delay length table, the filter factor table, the amplification factor table, and the interpolation calculation means;
a plurality of delay circuits, each coupled through the interpolation calculation means to the delay length table;
a plurality of filter circuits, each coupled through the interpolation means to the filter factor table and to a different one of the plurality of delay circuits;
a plurality of amplifiers, each coupled through the interpolation calculation means to the amplification factor table and to a different one of the plurality of filter circuits; and
a sound source circuit for providing a tone signal to each of the plurality of delay circuits.

10. An acoustic image localizing system as claimed in claim 9, further comprising a keyboard coupled to the sound source circuit to determine the tone signal provided by the sound source circuit.

11. An acoustic impulse detecting device comprising:
acoustic impulse generating means for generating a first acoustic impulse from a first position in a three-dimensional space;
measuring means for measuring a first impulse response corresponding to said first acoustic impulse with a sensor attached to a first ear of a skull-shaped object having two ears; and
forming means for forming, based on said measured first impulse response, a second acoustic impulse response for receipt at a second ear of said skull-shaped object if said second acoustic impulse is generated from a second position different from said first position in said three-dimensional space.

12. An acoustic impulse detecting device according to claim 11, wherein said second position is located such that a distance between said first position and said first ear is the same as a distance between said second position and said second ear.

13. An acoustic impulse detecting device according to claim 11, wherein said second position is located such that a line connecting said first position with said first ear is symmetrical with a line connecting said second position with said second ear relative to a line perpendicular to a line connecting said two ears and crossing at the center of said line connecting said two ears.

14. An acoustic image localizing system comprising:
a delay length table for storing delay times for a plurality of different directions;

a filter factor table for storing filter factors for the plurality of different directions;

an amplification factor table for storing amplification factors for the plurality of different directions;

interpolation calculation means coupled to the delay length table, the filter factor table and the amplification factor table;

at least one delay circuit coupled through the interpolation calculation means to the delay length table;

at least one filter circuit coupled through the interpolation means to the filter factor table;

at least one amplifier coupled through the interpolation calculation means to the amplification factor table; and a sound source circuit for providing a tone signal to the at least one delay circuit, to the at least one filter circuit, or to the at least one amplifier, wherein the tone signal provided by the sound source signal is modified by the output of the at least one delay circuit, the at least one filter circuit, or the at least one amplifier.

15. An acoustic image localizing system as claimed in claim 14, further comprising:

memory means for storing response waveform information of acoustic impulses, each provided to a skull-shaped object from a plurality of locations;

localization specifying means for specifying a location of a tone;

readout means for reading out the impulse response waveform information, from the memory means, corresponding to an acoustic impulse provided to the skull-shaped object from a location specified by the localization specifying means; and an impulse response waveform filter responsive to a digital tone signal for controlling characteristics of the digital tone signal, wherein filter characteristics are established depending on impulse response waveform information read out by the readout means.

16. An acoustic image localizing system as claimed in claim 15, wherein said impulse response waveform filter is a finite impulse response filter.

17. An acoustic image localizing system as claimed in claim 15, wherein said impulse response waveform filter comprises a shift register coupled to receive the digital tone signal and having a plurality of serially coupled registers, a common adder, and a plurality of variable gain amplifiers, each coupling a different one of the plurality of registers to the common adder and having a gain determined by the response waveform information from the memory means.

18. An acoustic image localizing system as claimed in claim 14, said system having a plurality of channels, each channel including at least one delay circuit, at least one filter circuit and at least one amplifier, said system further including control means for controlling delay time of the at least one delay circuit, filtration characteristics of the at least one filter circuit and gain of the at least one amplifier in each of said channels in accordance with stored digital transmission data.

19. An acoustic image localizing system as claimed in claim 18, wherein said control means includes direction specifying means for specifying a direction of acoustic image localization, and further including readout means for reading out stored digital transmission data corresponding to the direction specified by the direction specifying means, wherein delay time of the at least one delay circuit, filtration characteristics of the at least one filter circuit, and gain of the at least one amplifier in each channel are controlled according to the direction specified by the direction specifying means.

20. An acoustic image localizing system as claimed in claim 18, further comprising:

a table for storing therein transmission data including delay time, filtration characteristics, and amplification factors to simulate transmission of an emitted tone to the ears of a listener for each of plural directions to the listener;

localizing direction specifying means for specifying a direction of acoustic image localization of a tone; and readout means for reading out transmission data corresponding to the direction specified by the localizing direction specifying means from the table for controlling delay time of the at least one delay circuit, filtration characteristics of the at least one filter circuit, and amplification factors of the at least one amplifier.

21. An acoustic image localizing system as claimed in claim 20, wherein the at least one filter circuit is a finite impulse response filter.

22. An acoustic image localizing system comprising:

a delay length table for storing delay times for a plurality of different directions;

a filter factor table for storing filter factors for the plurality of different directions;

an amplification factor table for storing amplification factors for the plurality of different directions;

interpolation calculation means coupled to the filter factor table;

a tone image localization position circuit coupled to the delay length table, the filter factor table, the amplification factor table, and the interpolation calculation means;

at least one delay circuit coupled to the delay length table;

at least one amplifier coupled through the interpolation calculation means to the amplification factor table;

at least one filter circuit coupled through the interpolation means to the filter factor table, so that when the tone image localization position circuit specifies a tone image direction that does not correspond to a direction stored in the filter factor table, the interpolation means reads out at least two filter factors corresponding to tone image localization directions adjacent to the specified tone image direction and the interpolation means calculates an interpolated filter factor from the at least two filter factors corresponding to tone image directions adjacent to the specified tone image direction; and a sound source circuit for providing a tone signal to the at least one delay circuit, to the at least one filter circuit, or to the at least one amplifier, wherein the tone signal provided by the sound source signal is modified by the output of the at least one delay circuit, the at least one filter circuit, or the at least one amplifier.

* * * * *